A. MUNCHAUSEN.
BERRY CARRIER.
APPLICATION FILED JULY 10, 1911.
1,005,998.
Patented Oct. 17, 1911.
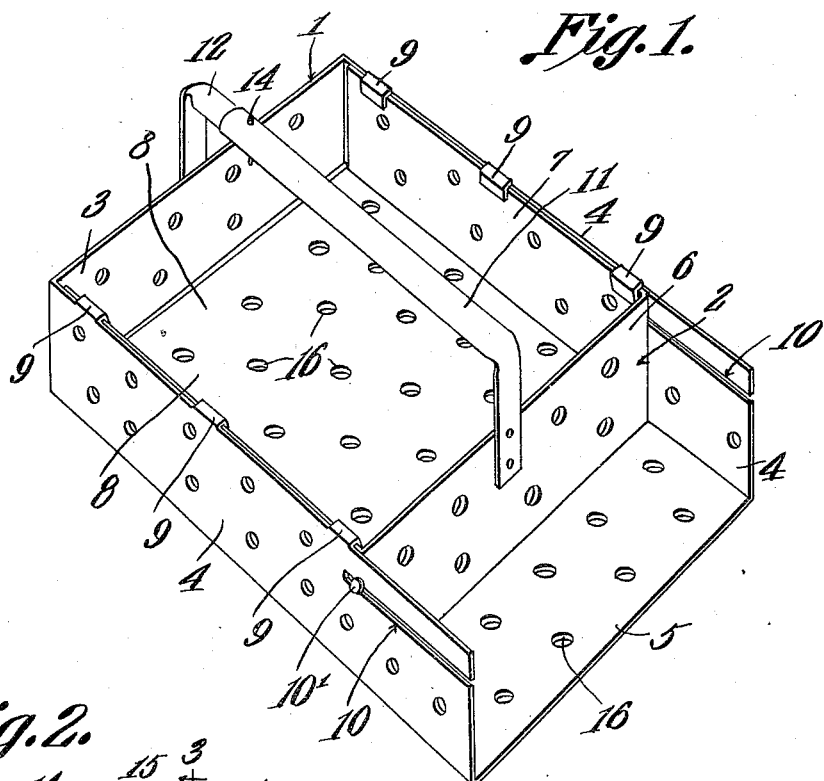
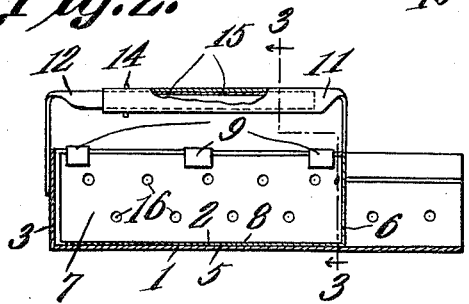
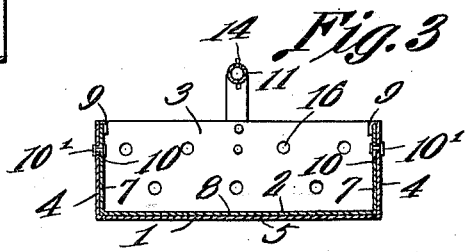
Arthur Munchausen,
Inventor
Witnesses
by C. A. Snow & Co.
Attorneys

UNITED STATES PATENT OFFICE.

ARTHUR MUNCHAUSEN, OF INDEPENDENCE, LOUISIANA.

BERRY-CARRIER.

1,005,998.

Specification of Letters Patent.    Patented Oct. 17, 1911.

Application filed July 10, 1911.   Serial No. 637,692.

*To all whom it may concern:*

Be it known that I, ARTHUR MUNCHAUSEN, a citizen of the United States, residing at Independence, in the parish of Tangipahoa and State of Louisiana, have invented a new and useful Berry-Carrier, of which the following is a specification.

The device forming the subject matter of this application, is a carrier, adapted to be employed in the picking of berries and like bush-carried fruit.

The invention aims to provide a carrier in which the fruit may be collected, and be handled in a sanitary manner.

A further object of the invention is to provide a carrier for fruit, consisting of telescoped parts, which may be separated, to adjust the capacity of the carrier, means being provided for maintaining the parts of the carrier in fixed relation with respect to each other.

A further object of the invention is to provide a novel form of elements coöperating to connect, slidably, and adjustably, the constituent elements of the carrier.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a longitudinal section; and Fig. 3 is a transverse section upon the line 3—3 of Fig. 2.

The invention includes an outer, box-like receptacle 1, having but a single end wall, within which outer receptacle fits slidably, an inner receptacle 2, having but one end wall, the construction, obviously, as Fig. 1 will show, being such that when the end walls of the receptacles are separated, the capacity of the carrier will be increased. The outer receptacle 1 consists of a single end wall 3, side walls 4, and a connecting bottom 5, the receptacle 1, therefore, being open at one end. The inner receptacle 2 consists of a single end wall 6, side walls 7, and a bottom 8, the receptacle 2 being open at one end.

In order to maintain the receptacles 1 and 2 assembled, for longitudinal sliding movement, yet against transverse separation, the side walls 4 of the outer member 1 are equipped adjacent their upper edges, with clips 9, adapted to overhang the upper edges of the side walls 7 of the inner receptacle 2. Moreover, the inner receptacle 2 is provided, adjacent its end wall 6 with outstanding studs 10' adapted to register slidably in slots 10, formed in the side walls 4 of the outer receptacle 1, the slots 10 being extended through the edges of the side walls 4, so that the receptacle 2 may readily be removed from within the receptacle 1.

Secured to the end walls 6 and 3, are rectangularly disposed, coöperating, handle-forming portions 11 and 12, respectively, the portion 12 fitting slidably within the portion 11. Relative movement between the parts 11 and 12 is prevented by means of a pin 14, inserted through the part 11, and adapted to register successively in openings 15 in the part 12. It will be seen that by mounting the pin 14 successively in the openings 15, the walls 6 and 3 may be spaced apart by different distances, thereby increasing and decreasing the capacity of the receptacle. The receptacles 1 and 2 may be perforated, as shown at 16. These perforations 16 should be of sufficient size to permit foreign matter to drop free of the berries, without, however, being sufficiently large to permit the berries to drop therethrough.

The entire device, it is to be understood, is preferably fashioned from sheet metal, thereby promoting the cleanliness of the structure.

In practical operation, the berries are picked with a relatively long stem, so that the hand of the operator will not come into contact with the berries. The berries and their stems are then dropped into the carrier, until the same is full. By removing the pin 14, the receptacle 2 may be slid outwardly, free from the receptacle 1. The filled receptacle 2 will then be placed in the hands of the packer, and another, empty receptacle 2 will be mounted within the receptacle 1, the carrier being placed in the hands of the picker, who will thereupon resume his duties. While one of the inner receptacles 2 is in the hands of the packer, another of the receptacles 2 will be mounted within the receptacle 1, and be in the hands of the picker, in the field.

From the foregoing it will be seen that the device is so constructed that cleanliness is promoted, and a means is likewise provided whereby the quantity of berries picked, may be accurately measured. Moreover, the carrier may be readily adjusted, so as to accommodate different quantities of berries.

Having thus described the invention, what is claimed is:—

1. A device of the class described comprising inner and outer box-like receptacles, slidably engaged, and having each, but one end wall; a two-part handle, the parts of which are rigidly connected with the end walls; and means for adjustably connecting the parts of the handles, to adjust the space between the end walls.

2. A device of the class described comprising inner and outer box-like receptacles, slidably engaged, and having each, but one end wall; a two-part handle, the parts of which are connected to the end walls, one part telescoping within the other part; and a pin insertible through the handle parts, at spaced points, to effect an adjustment between the end walls.

3. A device of the class described comprising inner and outer box-like receptacles, slidably engaged and having, each, but one end wall; a two-part handle, the parts of which are rigidly secured to the end walls; means for adjustably connecting the parts of the handle; the inner receptacle having studs adapted to register slidably in slots formed in the side walls of the outer receptacle, and extended through the edges of the side walls, to permit a separation of the receptacles.

4. A device of the class described, comprising inner and outer box-like receptacles, slidably engaged, and having, each but one end wall; a two-part handle, the parts of which are telescoped, and rigidly secured to the end walls; means for connecting the telescoped parts adjustably, clips formed upon the outer receptacle, and adapted to overhang the edges of the inner receptacle; and studs upon the inner receptacle, adapted to move slidably in slots formed in the side walls of the outer receptacle, the slots being extended through the edges of the side walls, to permit a free separation of the receptacles.

In testimony that I claim the foregoing as my own, I have hereto affixed my signature in the presence of two witnesses.

ARTHUR MUNCHAUSEN.

Witnesses:
  O. W. HERRING,
  JOS. DURBIN.

---

Copies of this patent may be obtained for five cents each, by addressing the "Commissioner of Patents, Washington, D. C."